United States Patent
Bress et al.

(10) Patent No.: US 7,440,886 B2
(45) Date of Patent: *Oct. 21, 2008

(54) SYSTEMS AND METHODS FOR TESTING HOW COMPUTER SYSTEMS INTERACT WITH LONG-TERM MEMORY STORAGE DEVICES

(76) Inventors: Steven Bress, 17917 Wheatridge Dr., Germantown, MD (US) 20874; Mark Joseph Menz, 114 Rawlings Ct., Folsom, CA (US) 95630; Daniel Bress, 17917 Wheatridge Dr., Germantown, MD (US) 20874

(*) Notice: Subject to any disclaimer, the term of this patent is extended or adjusted under 35 U.S.C. 154(b) by 593 days.

This patent is subject to a terminal disclaimer.

(21) Appl. No.: 10/995,632

(22) Filed: Nov. 23, 2004

(65) Prior Publication Data

US 2006/0111889 A1   May 25, 2006

(51) Int. Cl.
*G06F 9/455* (2006.01)

(52) U.S. Cl. .......................................... 703/25; 703/21
(58) Field of Classification Search .................. 703/21, 703/24, 25; 710/314; 714/741
See application file for complete search history.

(56) References Cited

U.S. PATENT DOCUMENTS

| | | | | |
|---|---|---|---|---|
| 5,394,540 A | * | 2/1995 | Barrington et al. | 703/21 |
| 5,457,694 A | * | 10/1995 | Smith | 714/12 |

* cited by examiner

*Primary Examiner*—Paul L Rodriguez
*Assistant Examiner*—Luke Osborne

(57) ABSTRACT

A testing device to test how computer systems interact with computer long-term storage devices, such as hard drives. The testing device is placed between a host computer and the storage device. The testing device intercepts communications between the host and the storage device and examines any commands from the host to the storage device. The testing device may respond to an Information ID request from the host with predetermined data, not the storage device's actual data. The testing device may respond to a read or write command to a specific sector with an error message from a predetermined list of sectors and errors.

5 Claims, 7 Drawing Sheets

Command Register — Read Sector Command

| Register | Data | |
|---|---|---|
| Features | | ～115 |
| Sector Count | Sector Count | ～101 |
| Sector Number | Sector Number or LBA | ～102 |
| Cylinder Low | Cylinder Low or LBA | ～103 |
| Cylinder High | Cylinder High or LBA | ～104 |
| Device/Head | Device ID and Head Number or LBA | ～105 |
| Command | 020h | ～106 |

Command Register — Write Sector Command

| Register | Data | |
|---|---|---|
| Features | | ～115 |
| Sector Count | Sector Count | ～101 |
| Sector Number | Sector Number or LBA | ～102 |
| Cylinder Low | Cylinder Low or LBA | ～103 |
| Cylinder High | Cylinder High or LBA | ～104 |
| Device/Head | Device ID and Head Number or LBA | ～105 |
| Command | 030h | ～106 |

Fig. 1A

Read Sector Command

| Register | Data |
|---|---|
| Features | 115 |
| Sector Count | 101 |
| Sector Number | Sector Count / 102 |
| Cylinder Low | Sector Number or LBA / 103 |
| Cylinder High | Cylinder Low or LBA / 104 |
| Device/Head | Cylinder High or LBA / 105 |
| Command | Device ID and Head Number or LBA |
| | 020h / 106 |

Command Register

Fig. 1B

Write Sector Command

| Register | Data |
|---|---|
| Features | 115 |
| Sector Count | 101 |
| Sector Number | Sector Count / 102 |
| Cylinder Low | Sector Number or LBA / 103 |
| Cylinder High | Cylinder Low or LBA / 104 |
| Device/Head | Cylinder High or LBA / 105 |
| Command | Device ID and Head Number or LBA |
| | 030h / 106 |

Command Register

SYSTEMS AND METHODS FOR TESTING HOW COMPUTER SYSTEMS INTERACT WITH LONG-TERM MEMORY STORAGE DEVICES

BACKGROUND OF THE INVENTION

A. Field of the Invention

The present invention relates to computer systems and, more specifically, to mechanisms for testing how these computer systems interact with long-term memory storage devices.

B. Description of Related Art

There is an obvious need to occasionally test how a computer system (host) interacts with a long-term memory storage device such as a hard drive, by individuals such as motherboard manufacturers, computer manufacturers, computer magazine reviewers and forensic device testers. When a host performs a read or write operation on a hard drive it may encounter an error message. How a host reacts to this error occasionally needs to be tested. A host interacts with a hard drive according to the hard drive's ID information on its features and capabilities. How a host reacts to different ID information occasionally needs to be tested.

A modern drive is composed of two main parts, a media where data is stored and a controller that reads and writes to the media. When a host issues read/write commands to a long-term memory storage device such as a hard drive, the host may encounter a bad area (sector) on the media. Upon encountering a bad sector the drive controller returns an error status when queried. In addition a register in the drive controller contains an error mode, such as: Error Always, Error on Read, Error on Write, Error Sometimes (Random), Error Sometimes then good after fixed number of retries for one or more attempts, Error Sometimes then good after random number of retries, etc.

Currently, to test how a host responds to an error, a tester assembles a collection of drives with known bad sectors. One might have a bad read sector, another a bad write sector, etc. One of the problems with this method is that drives change. Due to aging, temperature, humidity, etc. a sector that is good one day, might be bad another day, and vice versa. Because the status of sectors can change; this testing method is not reproducible. In addition, assembling, identifying and storing an assembly of drives with known bad sectors may be an onerous task.

For example, a magazine reviewer may be tasked with reviewing a disk-copying device. A device of this sort claims when it encounters a bad sector on the original, it writes all 0s on that sector, of a copy. To test this claim the reviewer needs a method to cause the device to respond to a bad sector on the original, in a known location.

Accordingly, there is a need in the art for an improved mechanism for testing how a host reacts to an error message from a memory storage device, such as a disk drive.

When a host encounters a long-term memory storage device such as a hard drive for the first time the host queries the device. The host needs detailed information about a device so the host will know how to address it correctly. For example, in the Drive ID packet of an IDE drive, information is reported that describes the speeds at which the drive may operate. A host that communicates with an IDE drive at the wrong speed will encounter errors.

Currently, to test how a host responds to a long-term memory storage device's ID information, a tester must assemble a large collection of drives. Assembling, identifying and storing a large assembly of drives may be an onerous task.

In addition, testing in this fashion is very time consuming. Finally, every time a drive is changed there is a small chance the host may be damaged.

Accordingly, there is a need in the art for an improved mechanism for testing how a host reacts to ID information from computer long-term memory storage devices.

In summary, long-term memory storage devices communicate to a host their functions and capabilities through their Drive ID information. In addition these devices indicate to a host when an error is encountered during a read or write operation. Current methods to test how a host interacts with a long-term memory storage device are inefficient and burdensome. Accordingly, there is a need in the art for an improved mechanism for testing how a host interacts with a long-term memory storage device, such as a disk drive.

SUMMARY OF THE INVENTION

Systems and methods consistent with the present invention address these and other needs by providing for an operating system independent testing device that is physically inserted between a host computer and a storage device.

One aspect of the invention is directed to a testing device including a plurality of elements. Specifically, the testing device includes an interface emulator configured to emulate an interface presented by a storage device and an interface for connecting to a storage device. Additionally, the testing device includes a processor coupled to the interface emulator and the interface. The processor examines commands received through the interface emulator that are generated by a host and intended for the storage device. If the processor detects an Identify Device command, it may block the response from the storage device and substitute a predetermined response. When the processor detects a read/write operation, the sector(s) to be operated on are compared to a predetermined sector list. The processor may block the read/write operation from being passed to the storage device and return an error message.

A second aspect of the invention is directed to a device that includes an IDE emulator component, an IDE interface, and a logic circuit. The IDE emulator component includes a physical interface designed to engage a first cable that connects to a host that controls an IDE storage device. The IDE interface is configured to engage a second cable that connects to the IDE storage device. The logic circuit connects the IDE emulator component to the IDE interface and examines commands received through the IDE interface emulator that are generated by a host and intended for the IDE storage device. If the logic circuit detects an Identify Device command, it may block the response from the IDE storage device and substitute a predetermined response. When the logic circuit detects a read/write operation, the sector(s) to be operated on are compared to a predetermined sector list. The logic circuit may block the read/write operation from being passed to the IDE storage device and return an error message.

Another aspect of the invention is a method that intercepts communications between a computer motherboard and a local storage device and compares commands in the communications between the motherboard and the storage device to a predetermined set of commands. Additionally, the method includes forwarding selected ones of the commands to the storage device based on the comparison and blocking selected other ones of the commands from being received by the storage device based on the comparison. Additionally the method includes after blocking a command responding to the motherboard from a predetermined set of responses.

Yet another aspect of the invention is directed to a computer system. The computer system includes a host computer, a long-term storage device, and a testing device coupled between the host computer and the storage device. The testing device is configured to intercept commands from the host to the storage device while blocking certain commands from reaching the storage device, and to pass other ones of the commands to the storage device. Additionally, after blocking commands to the storage device, the testing device is configured to respond to the host computer in a predetermined manner.

BRIEF DESCRIPTION OF THE DRAWINGS

The accompanying drawings, which are incorporated in and constitute a part of this specification, illustrate the invention and, together with the description, explain the invention. In the drawings, FIGS. 1A and 1B are diagrams illustrating register layouts for an IDE interface;

DETAILED DESCRIPTION

Figure 2:
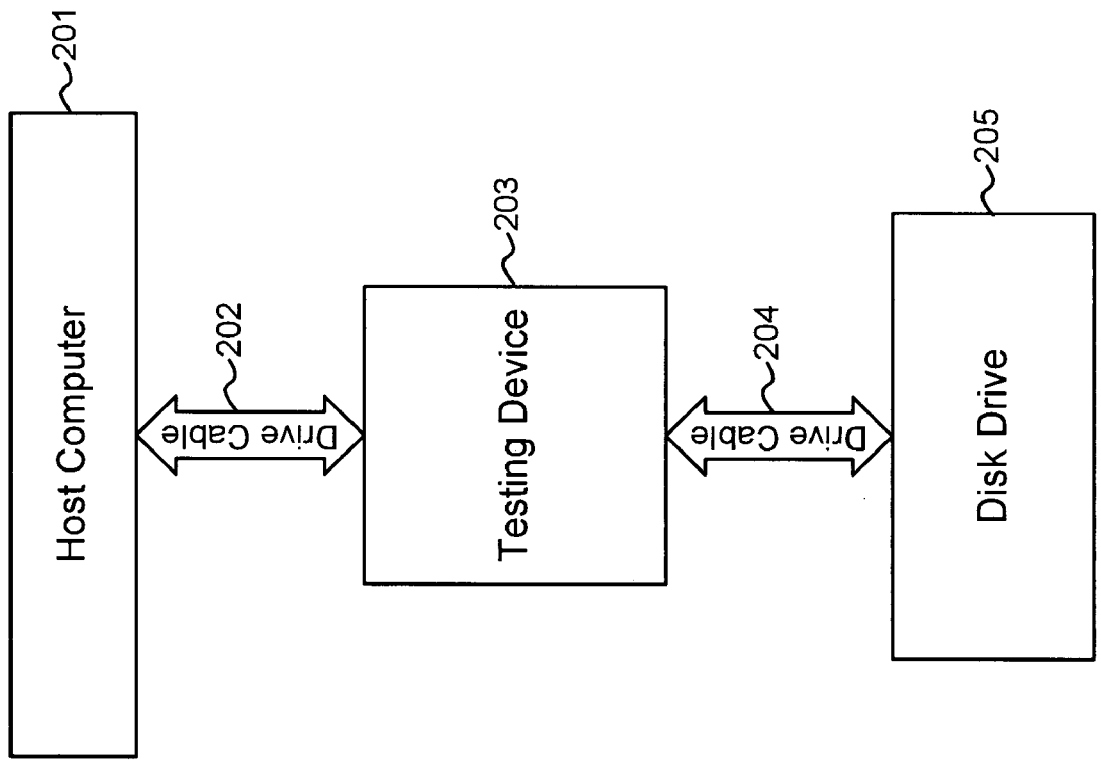
FIG. 2 is a diagram illustrating a testing device consistent with concepts of the invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

A testing device is described herein that blocks certain operations, such as read or write operations, as they are transmitted to a storage device. The testing device initiates a response to a host after blocking operations. The testing device is physically inserted between a host computer system and the storage device and is transparent to the host and the storage device.

The storage device may be any type of long-term non-volatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive. In IDE drives, the disk drive controller is built into the physical case of the disk drive. The IDE interface provides a relatively high level interface between the motherboard and the disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape and optical media, such as a compact disc (CD) and a digital versatile disc (DVD). In addition to the IDE interface, concepts consistent with the invention may be applied in a straightforward manner to other types of high level storage interfaces, such as the well known Small Computer System Interface (SCSI) standard or a hard drive connected through an IEEE 1394 (Firewire) connection.

For the sake of clarity the remaining description herein will be described with reference to an IDE magnetic hard drive, although, as mentioned above, the concepts of the invention are not limited to such drives. One skilled in the art would appreciate that other modern long-term storage device interfaces share similar functionality that could be incorporated into the concepts described herein.

IDE Drive

As previously mentioned, communications with an IDE drive occurs through its IDE interface. The IDE interface is a well-defined interface that has addressable memory registers in which the host device (e.g., the computer motherboard) can write commands. The host may also read these registers to, for example, retrieve status information. The IDE interface may additionally include memory used to buffer data going to or coming from the storage media.

FIGS. 1A and 1B are diagrams illustrating register layouts for an IDE interface through which a host transmits read commands (FIG. 1A) and write commands (FIG. 1B). When reading from a drive, the host uses sector count register 101, sector number register 102, cylinder low register 103, cylinder high register 104, device ID/head number register 105, and command register 106. The host writes the number of sectors that it would like to read into sector count register 101. The host writes to registers 102, 103, 104, and part of register 105 to tell the drive how many sectors are to be read by the command. In order to read a sector from a drive, the host writes a series of bytes to these registers.

Register 101 is a sector count register that tells the drive how many sectors should be read by the read command. For older drives, the sector was specified in a more convoluted way, using sector number register 102, cylinder number registers 103 and 104, and a head number in register 105. For backwards compatibility, these designations are still shown in the illustrated drive command table. More recent drives may use the Logical Block Addressing mode, or LBA, to describe the starting sector number. In this mode, the starting sector number is directly specified.

Register 105 has one bit reserved to specify a device number. Up to two drives may share the same IDE cable. This reserved bit is used to select between the two drives. With two drives, one is designated as a "master" device and the other is designated as a "slave" device. Both drives on the cable receive all of the commands, but only the drive that corresponds to the state of the reserved bit will act on commands.

The drive begins to execute commands when the host writes a read command (illustrated as hexadecimal number 020 in FIG. 1A) to register 106. For a read command, the drive will retrieve data from the drive platters and start transferring data to the host.

FIG. 1B illustrates the register layout for a write command. The register layout is similar to that of a read command. Sector count register 101 holds the number of sectors that are to be written. Also, the address of the starting sector is set in sector number register 102, cylinder low register 103, cylinder high register 104, and device ID/head number register 105 in the same manner in which the host sets the starting sector for a read command. The drive begins to execute the write commands when the host writes a write command (illustrated as hexadecimal number 030) to command register 106. In general, the only difference between the read and write command is in the value written to the command register 106.

In FIGS. 1A and 1B, register 115 is a "feature" register through which an IDE drive may pass data. As can be seen from the above description of the read and write register layouts, the host must write data to at least some of registers 101-106 in order to issue either a read or a write command to the drive. Therefore, for the drive to be read, the interface lines connecting the host to the IDE drive must be allowed to operate. The drive has no way to determine whether the incoming command will be a read or write until the command register is written.

Testing Device

FIG. 2 is a diagram illustrating a testing device 203 consistent with the present invention. Testing device 203 may be a physical device inserted between a host computer 201 and a long-term storage device, such as hard disk drive 205. Host computer 201 may be connected to testing device 203 through a standard cable 202. Similarly, drive 205 may be connected to testing device 203 through a standard cable 204.

To host computer 201, testing device 203 appears to be a standard drive interface, such as an IDE drive interface, and presents to the host 201 the memory, registers, and control signals that a drive would normally present to host 201. To drive 205, testing device 203 appears to be a host computer, and presents to drive 205 the memory, registers, and control signals that host 201 would normally present to drive 205. In other words, testing device 203 is transparent to the system. This is advantageous, as testing device 203 is therefore operating system independent and does not require software to be installed on host 201. Moreover, testing device 203 may be physically designed to aid an untrained user in connecting it in the correct direction. More specifically, in one implementation, the cables may be color coded or physically mated to encourage the user to connect the cables in the correct direction. When cables 202 and 204 are plugged into testing device 203, the testing device is completely installed and ready to operate. Accordingly, installation of testing device 203 can be performed by users that are relatively unsophisticated in the computer field.

Figure 3:
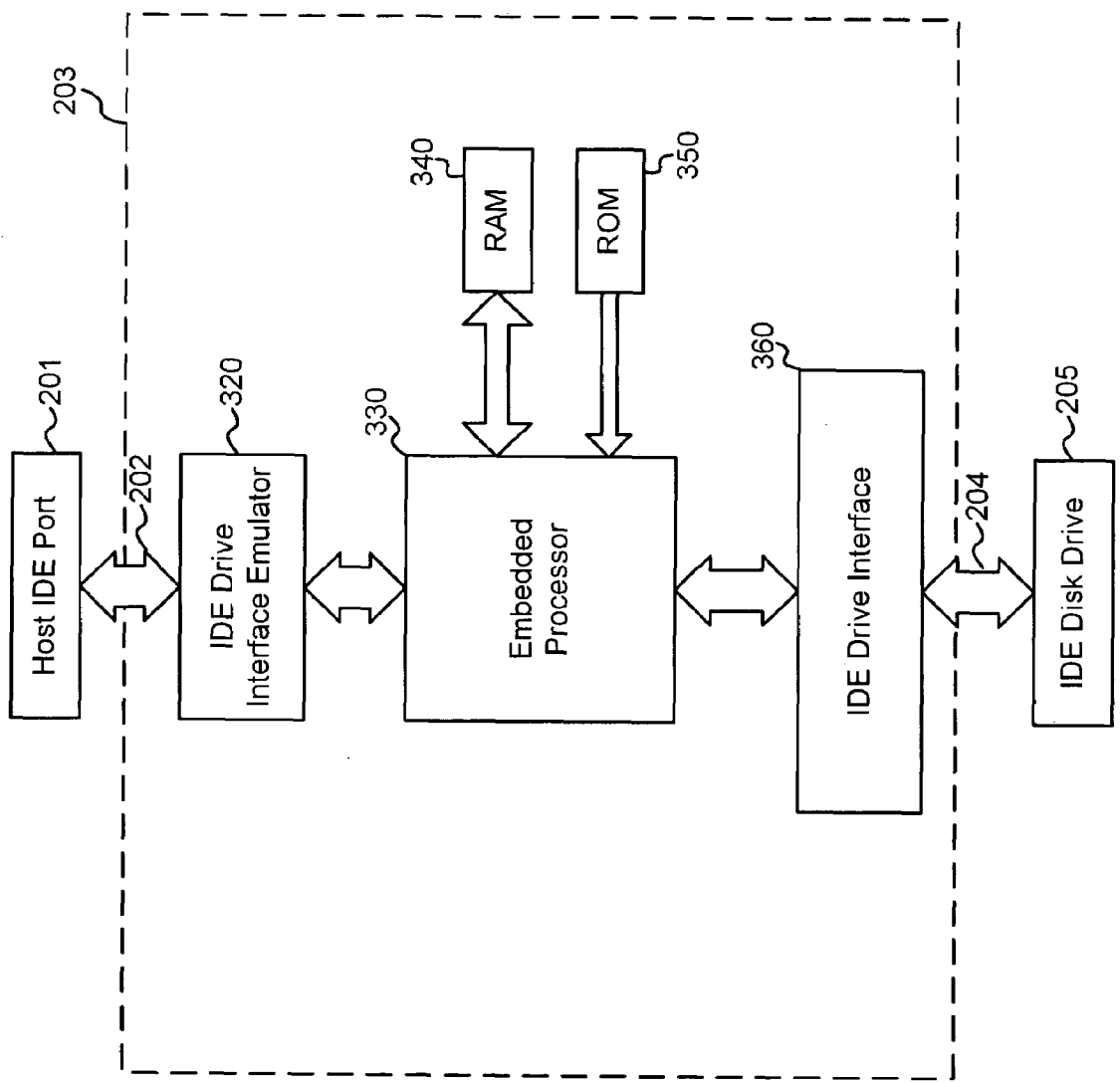
FIG. 3 is a diagram illustrating the testing device of FIG. 2 in additional detail.

FIG. 3 is a diagram illustrating testing device 203 in additional detail. Testing device 203 includes three main components: an IDE drive emulator 320, embedded processor 330, and IDE drive interface 360. When host 201 attempts to communicate with drive 205, the host 201 is actually communicating with IDE drive emulator 320. Drive emulator 320 delays the communication from host 201 until embedded processor 330 has examined the communication. Embedded processor 330, based on its examination of the command from host 201, may either pass the command to IDE drive interface 360 or drop (block) the command. If embedded processor 300 does drop (block) a command it may emulate a response from the drive to the host. In addition, the embedded processor may write a Drive ID packet to the IDE drive emulator 320, which is different from a Drive ID packet that drive 205 would write. IDE drive interface 360 is a standard IDE drive interface that connects testing device 203 to drive 205.

Embedded processor 330 may be additionally coupled to RAM 340 and ROM 350. RAM 340 and ROM 350 are computer readable media that may store processing instructions and data used by embedded processor 330.

When a host wants information from a drive it sends a command. This could be a request for a Drive Identification Packet. When a host wants to read or write to a drive, it sends a read or write command along with the sector(s) to be acted on. For the purposes of our discussion, we will consider a command that reads sector xxx a different command from a command that reads sector yyy. For the purposes of our discussion we will consider any command that is not a read or write command a "system" command.

In operation, embedded processor 330 examines all commands received at IDE drive interface emulator 320, and compares them to a pre-determined list of commands stored in RAM 340. If there is not a match embedded processor 330 passes the command to the registers in drive 205 through IDE drive interface 360. IDE drive interface 360 may receive any requested information back from drive 205. This received information may then pass through embedded processor 330 and IDE drive interface emulator 320 before it is transmitted to host 201.

If embedded processor 330 determines that a command received through IDE drive interface 320 is a "system" command that is a match with a pre-determined list of commands stored in RAM 340, it will either accept and drop the command, or pass the command to the registers in drive 205 through IDE drive interface 360. Embedded processor 330 may respond to this command, through IDE Interface Emulator 320, from a predetermined list.

For example, host 200 sends an Identify Device command through IDE Port 201. Embedded processor 330 reads this command in IDE Drive Interface Emulator 320. Embedded processor 330 compares the command to a pre-determined list stored in RAM 340. If it is a match, embedded processor 330 passes the command to the registers in drive 205 through IDE drive interface 360. Embedded processor 330 may send an Identify Device packet to host 200 through IDE Drive Interface Emulator 320, from a predetermined list stored in RAM 340.

If embedded processor 330 determines that a command received through IDE drive interface 320 is a read command that is a match with a pre-determined list of commands stored in RAM 340, it will either accept and drop the command, or pass the command to the registers in drive 205 through IDE drive interface 360, according to a predetermined list. Embedded processor 330 may return an error code, from a pre-determined list stored in RAM 340, to host 200 through IDE Drive Emulator 320.

If embedded processor 330 determines that a command received through IDE drive interface 320 is a write command that is a match with a pre-determined list of commands stored in RAM 340, embedded processor 330 drops the command and, thus, does not write anything to drive 205. Testing device 203, however, will continue to accept the correct amount of data from host 201 as specified in the write command. Embedded processor 330 may simply discard this data. Embedded processor 330 may return an error code, from a pre-determined list stored in RAM 340, to host 200 through IDE Drive Emulator 320.

To prepare our current invention to test a drive a user must communicate to our device what is being tested. This is done through a standard communication interface. One skilled in the art will recognize that there are numerous, well known, trivial methods of accomplishing this communication.

Some commands to be tested are simple such as; always return an error when sector xx is accessed, return an error when sector xx is read, return an error when sector xx is written to, etc. Some commands to be tested require a processor to keep a history of commands sent such as; error sometimes (random), error sometimes then good after fixed number or retries for one or more attempts, error sometimes then good after random number of retries, etc. Some commands to be tested return a specified error code when a particular sector is accessed such as; write protected, crc error, read error, etc.

A host may issue commands other than read or write commands to a drive. A user may test any of those commands by having our device return a pre-specified response to that command. An example of these types of commands is a Capabilities Request command.

Figure 4:
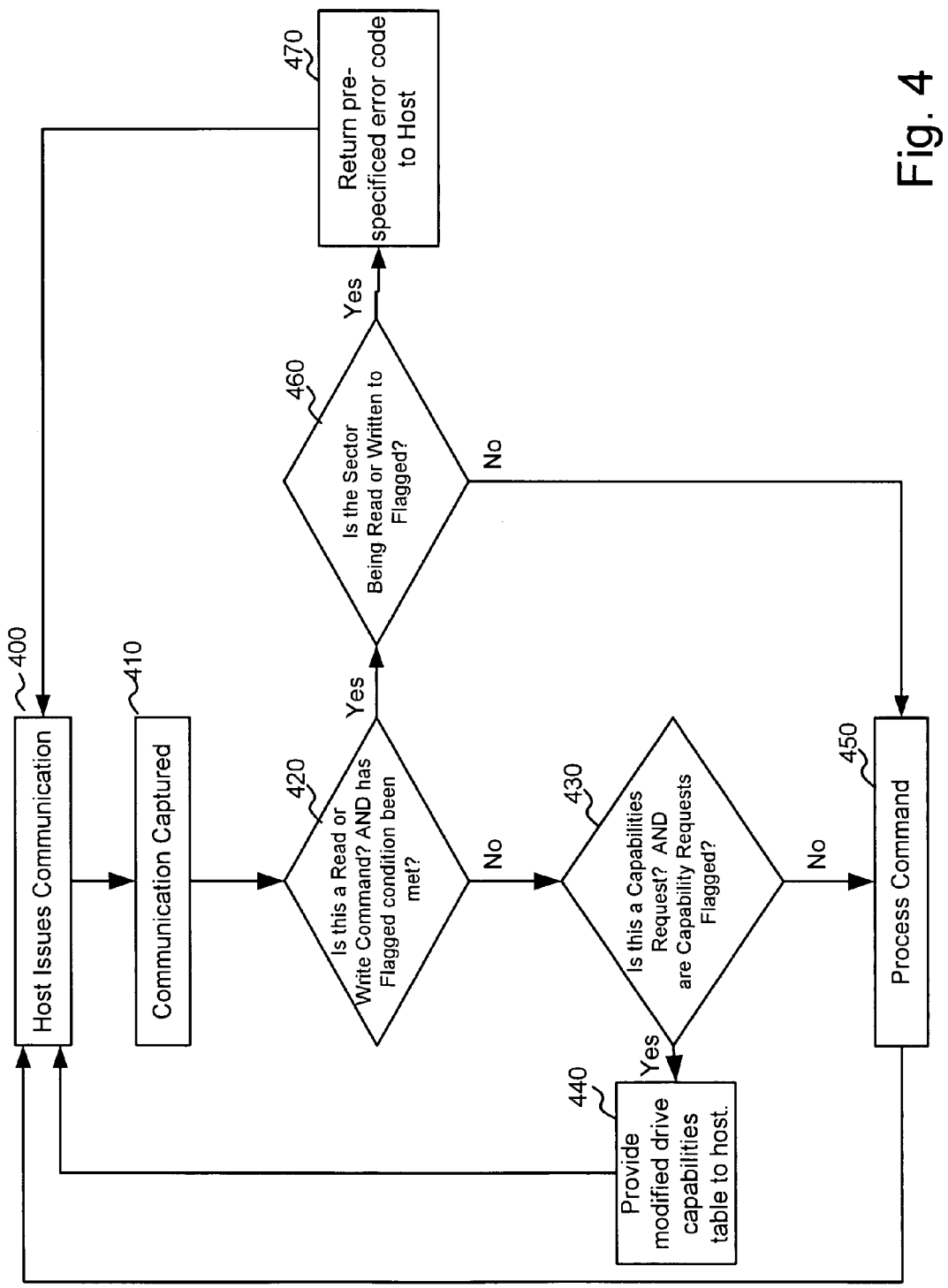
FIG. 4 is a flow chart illustrating the operation of the testing device.

FIG. 4 is a flow chart illustrating the operation of testing device 203 in additional detail. One skilled in the art will recognize that the exact order of the decision blocks depicted in FIG. 4 are for illustration purposes only. There are numerous, well known, trivial methods of programming to accomplish a decision tree and the exact method used is immaterial to our current invention.

To begin, host 201 communicates a command to drive 205 (act 400). The testing device 203 captures and holds communications until they are examined (act 410).

The communication is examined for whether it is write command, if a flagged condition has been met and if the sector named in the command is flagged (acts 420 and 460). If yes, the command and any associated data is accepted by testing device 203, and then discarded, blocking it from the drive. Because the testing device 203 accepts the command and any data associated with the command, such as the data the host 201 intends to write to drive 205, the host 201 believes the command and associated data has been successfully sent to drive 205. Embedded processor 330 sends an appropriate error code to host 201 (act 470).

The communication is examined for whether it is read command, if flagged condition has been met and if the sector named in the command is flagged (acts 420 and 460). If it is a read command, embedded processor 330 may pass the command to drive 205. Embedded processor 330 sends an appropriate error code to host 201 (act 470).

The communication is examined for whether it is a "system" command such as a Capabilities Request and if that command is flagged (act 430). If yes, embedded processor 330 may pass the command to drive 205. Embedded processor 330 sends a modified response to host 201 (act 440).

In all other cases testing device 203 allows the commands issued by host 201 to reach drive 205 and drive 205's response to reach host 201 (act 450). In these cases, testing device 203 is transparent to host 201 and drive 205.

In an alternate implementation to that described above, embedded processor 330 may maintain a list of "password" commands. Any received commands that are on the list and the password attached to it are saved, either in our device or in an external device through a standard communication interface.

In an alternate implementation to that described above, embedded processor 330 may analyze commands issued by host 201. It may be used to gather operating system statistics such as, number of reads per application, number of writes, etc.

In an alternate implementation to that described above, testing device 203 may save all commands issued by host. Additionally, testing device 203 may save all data associated with those commands.

In an alternate implementation to that described above, testing device 203 may be configured with a dedicated function only, such as detecting and storing passwords. An additional benefit results from this in that this implementation would enable testing device 203 to be physically small.

Details of an Implementation of the Testing Device

Figure 5:
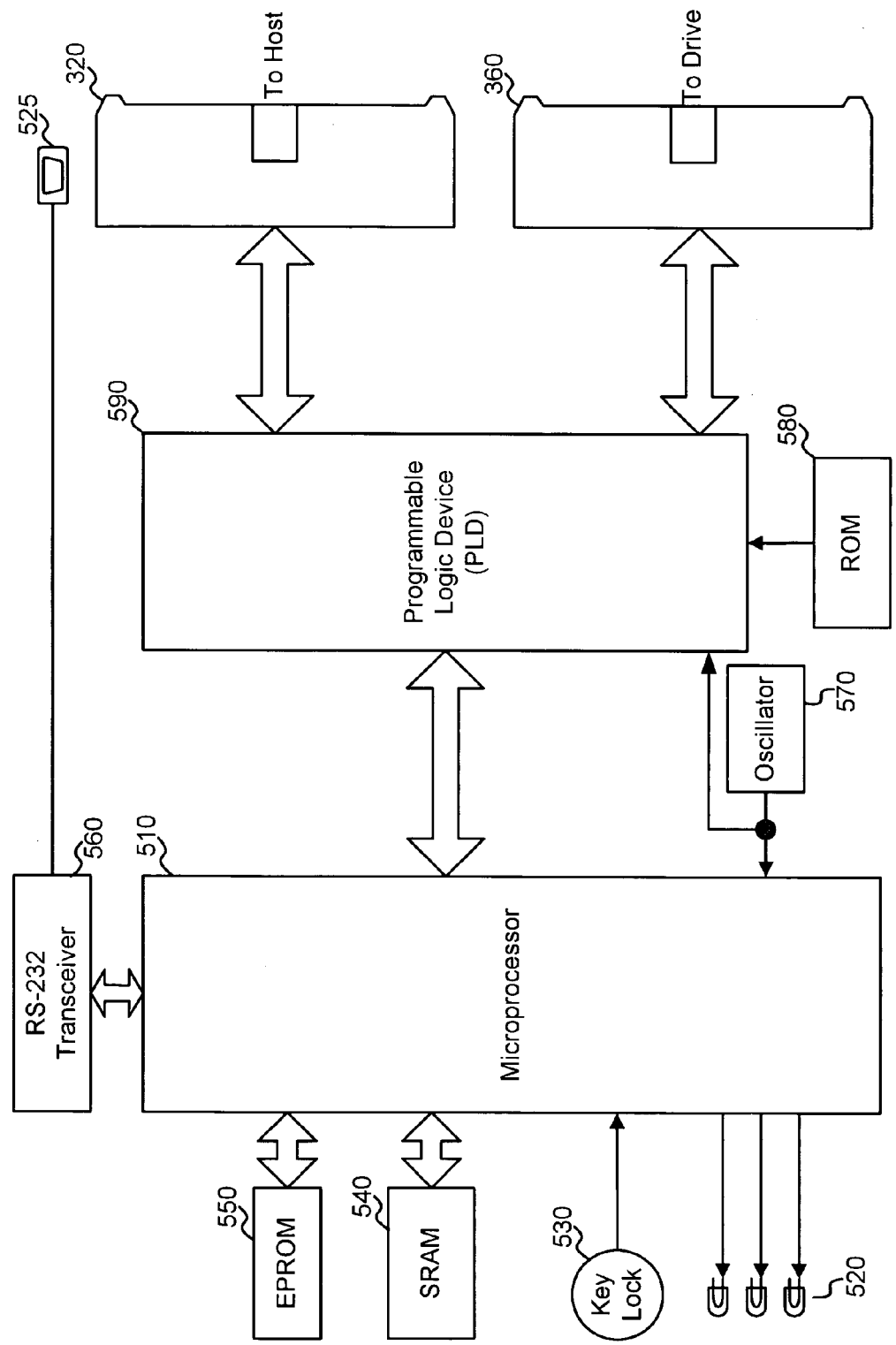
FIG. 5 is block diagram illustrating the testing device of FIGS. 2 and 3 in even more detail.

FIG. 5 is block diagram illustrating an exemplary implementation of testing device 203 in additional detail. The testing device includes microprocessor 510 and programmable logic device (PLD) 590. Microprocessor 510 may be an embedded processor, such as the KU80386EXTB-25 embedded processor manufactured by Intel Corporation, of Santa Clara, Calif. The integrated design of microprocessor 510 allows relatively little additional circuitry to be used to create a small, dedicated computer system. PLD 590 complements microprocessor 510 by performing logical operations required by the microprocessor 510 or other circuitry of the device 203. ROM 580 stores configuration data that is initially loaded into PLD 590 on start-up. Similarly, EPROM 550 stores the initial code necessary to initialize and run microprocessor 510. Static RAM (SRAM) 540 is also connected to microprocessor 510, and is used for temporary program and data storage. Crystal oscillator 570 provides clocking signals to microprocessor 510 and PLD 590. In one implementation, crystal oscillator 570 generates a 50 MHz clock signal.

Microprocessor 510 may control a number of external devices, such as LED status indicators 520 and a processor key lock 530. Through LED status indicators 520, microprocessor 510 may provide easily understandable feedback to a user. Processor key lock 530 is a physical interface through which a user must insert a physical key to enable microprocessor 510.

In addition to connecting to host 201 and drive 205 through interfaces 320 and 360, respectively, microprocessor 510 may be connected to external devices via RS-232 port 525 and RS-232 transceiver 560. RS-232 port 525 may be a standard DB9 connector that allows connections using a standard DB9 male to female serial cable.

One of ordinary skill in the art will recognize that the components shown in FIG. 5 may be selected from a wide variety of commercially available components. In one implementation, the components in FIG. 5 may be selected as follows: PLD 590, part number EP1K50QC208-2, available from Altera Corporation of San Jose, Calif.; ROM 580, part number EPC1PC8, available from Altera Corporation; EPROM 550, part number AT27LV020A90JC, available from Atmel Corporation, of San Jose, Calif.; and SRAM 540, part number CY7C1021V33L12ZCT, available from Cypress Corporation, of San Jose, Calif.

Figure 6:
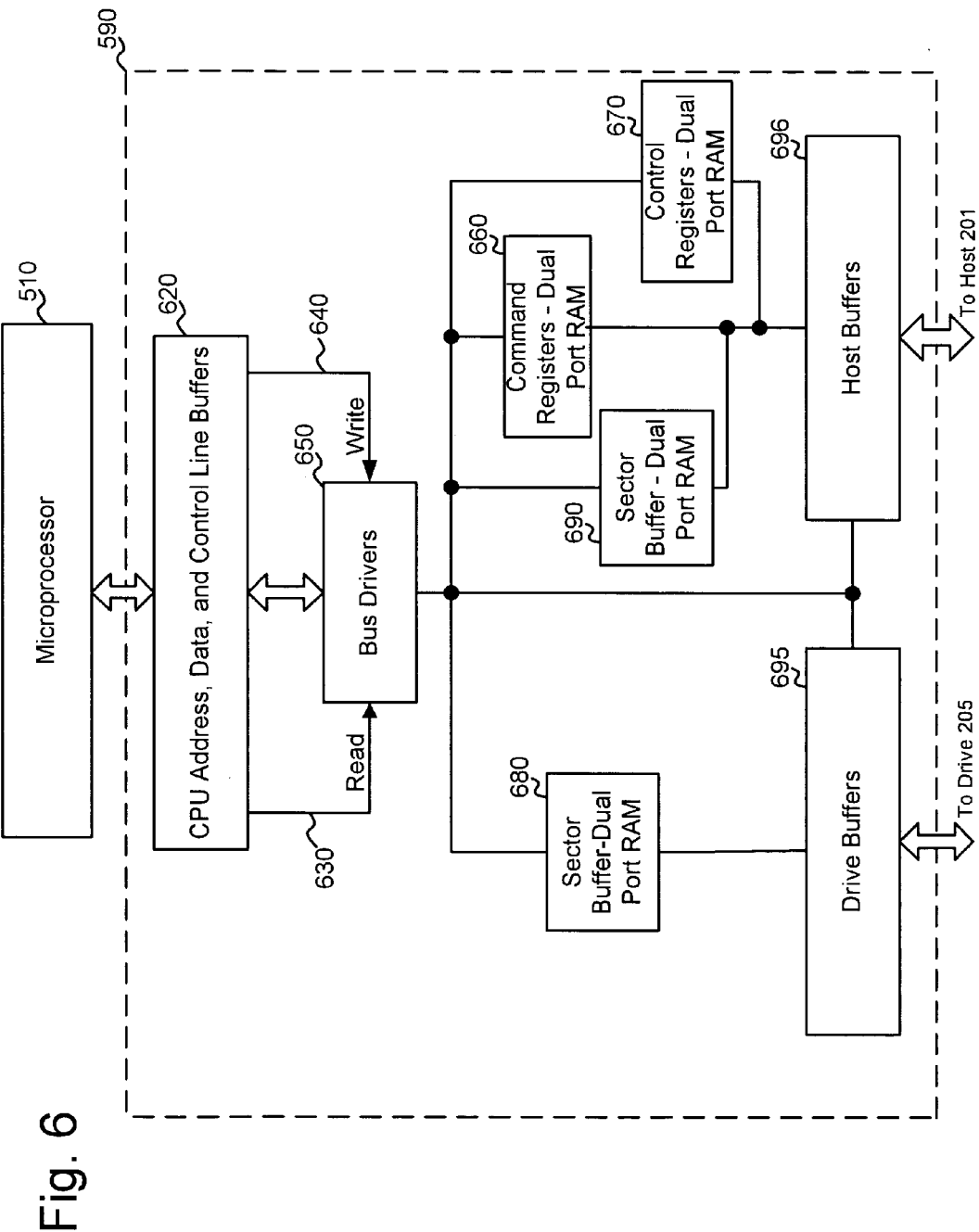
FIG. 6 is diagram graphically illustrating the functionality of portions of the testing device shown in FIG. 5.

FIG. 6 is diagram that graphically illustrates the functionality of PLD 590 in additional detail. Address, data, and control lines from the processor 510 are routed to PLD 590 where their information is buffered and latched as necessary in buffers 620. Buffers 620 serve to reduce the electrical load on the processor and to stabilize the signal timing. Buffer read and write signals 630 and 640 control the direction of the bus drivers 650. Thus, bus drivers 650 may write data into buffers 620 when read signal 630 is active and read data out of buffers 620 when write signal 640 is active. Buffers 620 and bus drivers 650 help control the data flow and distribution of the address and data busses from the processor 510 to other portions of PLD 590.

Buffering and signal conditioning for the disk drive 205 is provided by drive buffers 695, which form the drive interface with the disk drive 205. Through the bus drivers 650, the microprocessor 510 can directly read and write to the drive interface. Instead of directly communicating with drive buffers 695, bus drivers 650 may indirectly communicate with drive buffers 695 through dual ported RAM sector buffer 680. Sector buffer 680 provides an additional layer of buffering between the microprocessor 510 and the drive 205. This allows the drive to write one sector's worth of data to RAM at high speed, while the processor 510 reads a previous sector's worth of data. By allowing the operations to overlap in this fashion, the processor 510 is not restricted to running at the speed of the drive 205, and is free to handle other functions until it needs the data in the sector buffer 680.

Buffering and signal conditioning for host 201 is provided by drive buffers 696, which form the interface with the host 201. Through bus drivers 650, microprocessor 510 can directly read and write to the host buffers 696. A second way that microprocessor 510 and the drive 205 may communicate is through the dual ported RAM sector buffer 690. In a manner similar to the drive interface, the sector buffer 690 allows the host 201 to communicate at high speed without requiring immediate attention from the processor 510.

In addition to sector buffer 690, two other sections of dual ported RAM are provided by the PLD 590. These are control registers dual port RAM 670 and command registers dual port RAM 660. The control registers 670 may include eight bytes of RAM that appears to host 201 to be the hard drive's control register. Similarly, register 660 may be eight bytes of data that appears to the host to be the hard drive's command register. It is through these registers that the host 201 issues commands to the drive 205.

After a command has been written to the command byte of the command register 660, PLD 590 notifies microprocessor 510 that a command is pending. At this point, the acts illustrated in FIG. 4 are initiated. Because the command and control registers are both created with dual port RAM, the processor 510 may wait until the entire command has been issued to interrogate the contents of these registers. This provides for a zero wait state performance to the host 201, allowing for optimal system performance.

Read Verification After Writing

Figure 7:
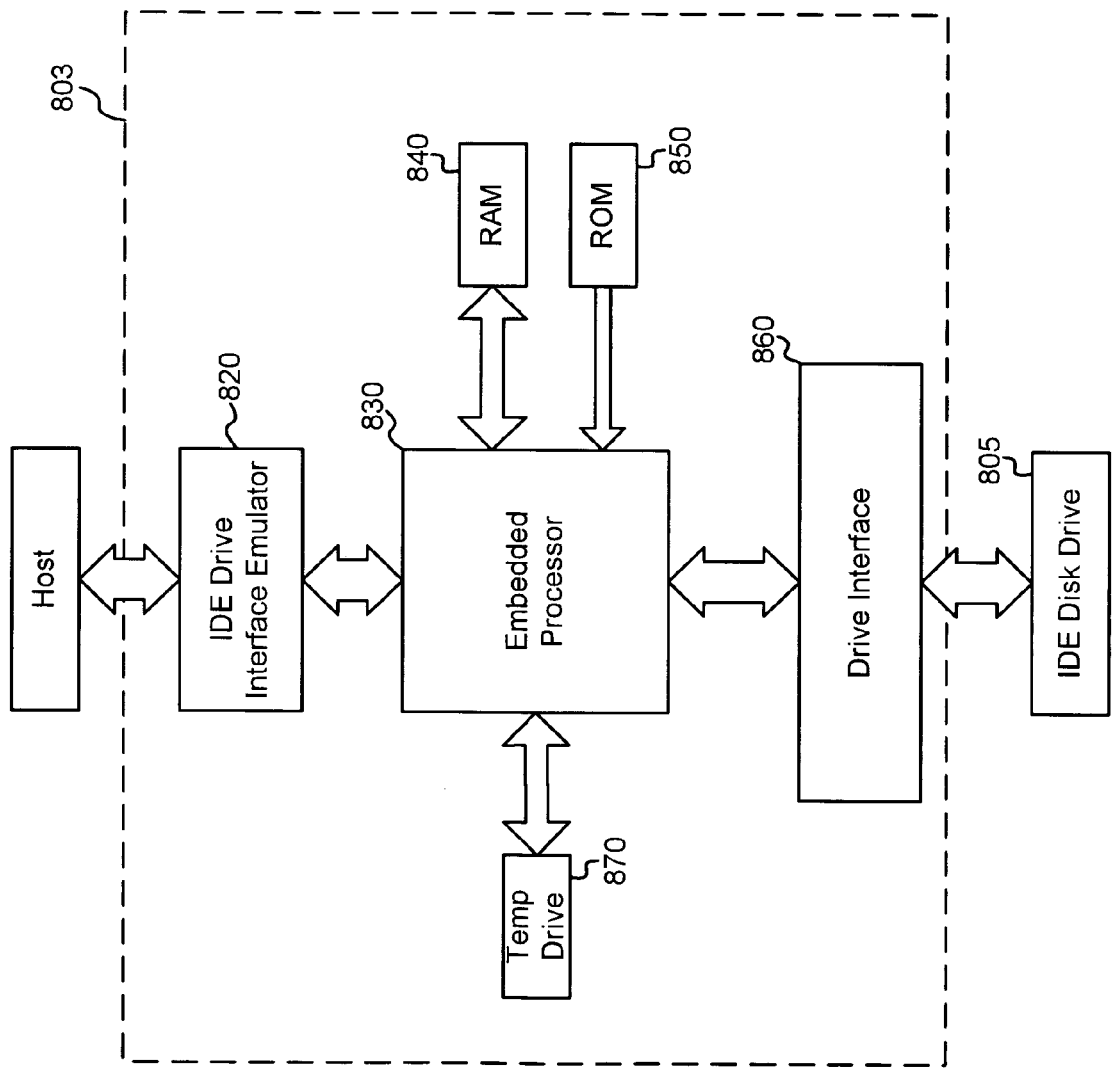
FIG. 7 is a diagram illustrating a testing device capable of correctly operating with an operating system that uses read-back-after-write commands.

There are situations in which a host writes data to a drive and immediately tries to verify that the data was in fact written by attempting to read it back. In particular, some commands used by some older operating systems, such as DOS, act in this manner. FIG. 7 is a diagram illustrating an exemplary embodiment of a testing device 803 capable of correctly operating with an operating system that uses read-back-after-write commands. This was taught in our U.S. Pat. No. 6,813, 682.

In general, testing device 803 is similar to testing device 203, except that testing device 803 additionally includes a "temp drive" 870, which is a long term storage device such as a hard disk drive. More particularly, as shown in FIG. 7, testing device 803 includes an embedded processor 830 that is coupled to drive interface emulator 820, drive interface 860, and temp drive 870. Additionally, embedded processor 830 may be connected to RAM 840 and ROM 850, which may store data and instructions used by embedded processor 830.

In operation, embedded processor 830, instead of discarding the data associated with blocked write commands, stores the data in temp drive 870. The drive being tested (i.e., drive 805) is not modified. Embedded processor 830 keeps track of the addresses written to temp drive 870. During a subsequent read operation that reads an address previously written to temp drive 870, embedded processor 830 returns the data stored in temp drive 870. For read requests that do not correspond to data previously written to temp drive 870, data is returned from drive 805. In this manner, testing device 803 and drive 805 appear to the host as a normally functioning disk drive.

In one implementation, because it is reasonable that the host may write as much data as drive 805 can hold, temp drive 870 is as large as drive 805.

After a predetermined amount of time after a write to temp drive 870, when it is no longer reasonable to expect a read after write verification, embedded processor 830 may erase the data (or otherwise cause it to become not available) written to the temp drive 870. After this time all new read requests provide data from the protected drive 805. Testing device 803 may also erase data on temp drive 870 if a new command comes in to read or write a different area of drive 805. This would indicate that any read after write verification of the earlier data had already occurred.

Although temp drive 870 is shown integrated within blocking device 803, in other implementations, temp drive 870 may be a separately attached drive.

Hosts that Use Local Write Cache

Some host computer systems may use a local cache to improve the performance of their disk drive. In this local cache, data written to the disk drive is also written to local memory, such as local semiconductor random access memory. If a subsequent read command requests a portion of the data that was previously written to the cache, the host can retrieve the data directly from the cache and will not have to read from the slower disk drive.

Hosts using a local cache may encounter problems when connected to a disk drive through the above-described implementations of the testing device. In particular, with the testing device installed, the data in the cache may not accurately reflect the data on the disk drive, as the data on the disk drive was never truly written. Accordingly, in systems that include such a local hard drive cache, the user may, if allowed by the operating system, simply turn off the local hard drive cache.

In another implementation, testing device 203 may support a removable drive feature set and report itself to the host as a removable drive. Many operating systems support the removable drive feature set. One feature of the removable drive feature set is that a write request may be rejected by the target drive with a "write protected error" code. This allows the operating system to gracefully fail and to not mark the write cache as valid. Accordingly, in operating systems that support the removable drive feature set and that use a local disk cache, embedded processor 330, in addition to dropping data that the host attempts to write to the disk drive, may also issue a write protected error code to the host.

In yet another implementation, the testing device may report to the host that the drive media is either not present or has been changed since the last write. In both of these cases, the operating system should fail gracefully and not mark the write cache data as valid.

Support for Obsolete Commands

Embedded processor 330 may be configured to respond to certain commands with a predetermined response pattern. For example, in systems with older BIOS (basic input/output system) software, the BIOS may issue a "recalibrate drive" command during system start-up. Generally, the recalibrate drive command causes the hard drive to perform a potentially time consuming calibration operation that may modify the drive. Embedded processor 330 may handle the recalibrate drive command by accepting the command and reporting a successful completion of the command to the host. However, embedded processor 330 does not pass the command to the disk drive. In this manner, the system is able to successfully initialize.

Summary

As described above, a testing device is inserted between a host computer system and a storage device. The testing device intercepts communications between the host and the storage device and examines any commands from the host to the storage device. The testing device may respond to an Information ID request from the host with predetermined data, not the storage device's actual data. The testing device may respond to a read or write command to a specific sector with an error message, from a predetermined list of sectors and errors.

One of ordinary skill in the art will appreciate that the testing device could reply to any command sent from the host with a response from a pre-determined list.

One of ordinary skill in the art will appreciate that the testing device could additionally analyze and/or store any or all commands and associated data sent from the host to the drive.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A testing device connected between an unknown host and a storage device, the testing device comprising:
   an interface emulator configured to emulate an interface presented by the storage device;
   an interface for connecting to the storage device;
   and a processor coupled to the interface emulator and the interface, the processor examining commands received through the interface emulator that are generated by the host and intended for the storage device, the processor passing selected commands to the storage device and blocking selected commands and responding to these blocked commands with pre-determined data; and the processor receiving data back from the storage device in response to the commands passed to the storage device and forwarding the received data to the host through the interface emulator; when the commands include a capabilities request command relating to the storage device, the processor modifies data received from the storage device relating to the capabilities request command to reflect the capability of the storage device as affected by the presence of the testing device;
   wherein the testing device is transparent to normal operation of the host and the storage device.

2. A testing device; an Integrated Drive Electronics (IDE) emulator component, the IDE emulator component including a physical interface designed to engage a first cable that connects to an unknown host that controls an IDE storage device;
   an IDE interface configured to engage a second cable that connects to the IDE storage device; and
   a logic circuit connecting the IDE emulator component to the IDE interface and configured to: examine commands received at the IDE emulator component and act upon them according to a predetermined set of cases, commands and sectors; and when the logic circuit receives data back from the IDE storage device the logic circuit may forward the received data to the host through the IDE emulator component, when the examination indicates the command includes a capabilities request command relating to the IDE storage device, the logic circuit modifies data received from the IDE storage device relating to the capabilities request command to reflect the capability of the IDE storage device as affected by the presence of the device;
   wherein the testing device is transparent to normal operation of the host arid the storage device.

3. A method comprising:
   intercepting communications between an unknown computer motherboard and a local non-volatile storage device for the motherboard;
   comparing commands in the communications between the motherboard and the storage device to a predetermined set of commands;
   forwarding selected ones of the commands to the storage device based on the comparison, when the commands forwarded to the storage device include a capabilities request command, the modifying data received from the storage device relating to the capabilities request command to reflect the capability of the storage device as modified by operation of the method;
   blocking selected other ones of the commands from being received by the storage device based on the comparison;
   returning error codes to the host from a pre-determined list;
   saving data;
   analyzing commands; and saving commands and/or data,
   wherein said operations are transparent to normal operation of the motherboard and the storage device.

4. A computer system comprising: an unknown host computer; a long-term storage device; and a testing device coupled between the host computer and the storage device, the testing device configured to: intercept commands from the host to the storage device, act upon certain commands, and pass other ones of the commands to the storage device, when the passed commands include a capabilities request command relating to the storage device, the blocking device modifies data received from the storage device relating to the capabilities request command to reflect the capability of the storage device as affected by the presence of the testing device;
   wherein the testing device is transparent to normal operation of the host add the storage device.

5. A testing device comprising:
   means for intercepting communications between an unknown host and a storage device;
   means for comparing commands in the communications between the host and the storage device to a predetermined set of commands;

means for analyzing commands in the intercepted communications;

means for emulating read/write errors on specific sectors means for returning a predetermined response to certain commands issued by a host, means for identifying and storing password commands and associated password means for storing commands and data means for forwarding selected ones of commands in the intercepted communications to the storage device based on the comparison, when the commands forwarded to the storage device include a capabilities request command, means for modifying data received from the storage device relating to the capabilities request command to reflect the capabilities of the testing device; and means for blocking selected other ones of the commands from being received by the storage device based on the comparison, wherein the testing device is transparent to normal operation of the host and the storage device.

* * * * *

UNITED STATES PATENT AND TRADEMARK OFFICE
Certificate

Patent No. 7,440,886 B2                                                                 Patented: October 21, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven Bress, Germantown, MD (US); and Mark Joseph Menz, Folsom, CA (US).

Signed and Sealed this Twenty-ninth Day of November 2011.

<div align="right">

PAUL RODRIGUEZ
*Supervisory Patent Examiner*
Art Unit 2123
Technology Center 2100

</div>